US012534298B2

(12) United States Patent
Yang et al.

(10) Patent No.: US 12,534,298 B2
(45) Date of Patent: Jan. 27, 2026

(54) METHOD AND APPARATUS FOR OUTBOUND DELIVERING ITEM

(71) Applicant: Beijing Jingdong Zhenshi Information Technology Co., Ltd., Beijing (CN)

(72) Inventors: Wenxiang Yang, Beijing (CN); Kun Wang, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 415 days.

(21) Appl. No.: 18/016,892

(22) PCT Filed: Oct. 8, 2021

(86) PCT No.: PCT/CN2021/122669
§ 371 (c)(1),
(2) Date: Jan. 19, 2023

(87) PCT Pub. No.: WO2022/078244
PCT Pub. Date: Apr. 21, 2022

(65) Prior Publication Data
US 2023/0271786 A1    Aug. 31, 2023

(30) Foreign Application Priority Data
Oct. 15, 2020  (CN) .......................... 202011100792.1

(51) Int. Cl.
*B65G 1/10*    (2006.01)
*B65G 1/04*    (2006.01)
*B65G 1/137*   (2006.01)

(52) U.S. Cl.
CPC ........... *B65G 1/1378* (2013.01); *B65G 1/045* (2013.01); *B65G 1/10* (2013.01); *B65G 1/1371* (2013.01); *B65G 2203/042* (2013.01)

(58) Field of Classification Search
CPC ........ B65G 1/1378; B65G 1/045; B65G 1/10; B65G 1/1371; B65G 2203/042; B65G 1/133; B65G 1/04; G06Q 10/08
See application file for complete search history.

(56) References Cited

U.S. PATENT DOCUMENTS

2023/0067416 A1    3/2023  Lu et al.

FOREIGN PATENT DOCUMENTS

| CN | 106144380 A |   | 11/2016 | |
|----|-------------|---|---------|---|
| CN | 106219128 A | * | 12/2016 | ............. B65G 1/133 |

(Continued)

OTHER PUBLICATIONS

Chinese Office Action for Chinese Application No. 202011100792. 1, dated Nov. 15, 2021, 14 pages.

(Continued)

*Primary Examiner* — Justin Holmes
(74) *Attorney, Agent, or Firm* — Buchanan Ingersoll & Rooney PC

(57) ABSTRACT

The present disclosure discloses a method and apparatus for delivering an item. A specific embodiment of the method includes: determining, in response to receiving a set of tasks comprising a plurality of outbound delivering tasks, in a plurality of storage areas, a storage position of a to-be-delivered item in each outbound delivering task in the set of tasks; determining, from the plurality of storage areas, a target storage area corresponding to the set of tasks based on storage positions of to-be-delivered items in outbound delivering tasks; determining, from the target storage area, target storage positions of the to-be-delivered items in outbound delivering tasks; and classifying to-be-delivered items, target storage positions of which belonging to a same shelf in a same storage area, in the set of tasks into a same picking task for outbound delivery processing.

22 Claims, 8 Drawing Sheets

(56) References Cited

FOREIGN PATENT DOCUMENTS

| | | | | |
|---|---|---|---|---|
| CN | 106516535 A | 3/2017 | | |
| CN | 109544054 A | 3/2019 | | |
| CN | 208915981 U | 5/2019 | | |
| CN | 109911503 A | 6/2019 | | |
| CN | 109948964 A | 6/2019 | | |
| CN | 110197351 A | 9/2019 | | |
| CN | 110717697 A | 1/2020 | | |
| CN | 110766194 A | 2/2020 | | |
| CN | 110775496 A | 2/2020 | | |
| CN | 111580952 A | 8/2020 | | |
| CN | 111661549 A | * 9/2020 | ........... | B65G 1/1373 |
| CN | 111738655 A | 10/2020 | | |
| CN | 111738656 A | 10/2020 | | |
| CN | 106980955 B | * 2/2021 | ........... | G06Q 10/087 |
| CN | 112455983 A | 3/2021 | | |
| DE | 102014109863 A1 | 1/2016 | | |
| JP | 2023504227 A | 2/2023 | | |

OTHER PUBLICATIONS

International Search Report and Written Opinion for International Application No. PCT/CN2021/122669, dated Dec. 17, 2021, 9 pages.

* cited by examiner

METHOD AND APPARATUS FOR OUTBOUND DELIVERING ITEM

CROSS-REFERENCE TO RELATED APPLICATIONS

This patent application is a U.S. national stage of International Application No. PCT/CN2021/122669, filed on Oct. 8, 2021, which claims the priority from Chinese Patent Application No. 202011100792.1, filed on Oct. 15, 2020. Both of the aforementioned applications are hereby incorporated by reference in their entireties.

TECHNICAL FIELD

Embodiments of the present disclosure relate to the field of computer technology, in particular, to a method and apparatus for outbound delivering an item.

BACKGROUND OF THE INVENTION

Item outbound delivering from a warehouse is an important part of warehousing operation. For example, fresh cold chain frozen items need to be stored in a low-temperature environment (e.g., −18° C.), and operators need to rest in a relatively comfortable environment after a period of operation in the low-temperature environment, which reduces an overall delivering efficiency and affects customer experience and supply chain timeliness. Therefore, this requires efficient operation and linkage of all operational aspects within the fresh cold chain warehousing.

In the prior art, to-be-delivered items are generally outbound delivered from corresponding storage positions by operators in the order of delivering tasks.

SUMMARY OF THE INVENTION

Embodiments of the present disclosure propose a method and apparatus for delivering an item.

In a first aspect, some embodiments of the present disclosure provide a method for delivering an item, where items are stored in a plurality of storage areas, each storage area in the plurality of storage areas comprises a plurality of shelf groups, each shelf group in the plurality of shelf groups comprises a plurality of shelves, each shelf is provided with a plurality of storage positions on separate shelf levels, and the method, and the method includes: in response to receiving a set of tasks including a plurality of outbound delivering tasks, determining, in the plurality of storage areas, a storage position of a to-be-delivered item in each outbound delivering task in the set of tasks; determining, from the plurality of storage areas, a target storage area corresponding to the set of tasks based on storage positions of to-be-delivered items in outbound delivering tasks; determining, from the target storage area, target storage positions of the to-be-delivered items in outbound delivering tasks; and classifying to-be-delivered items, the target storage positions of which belonging to a same shelf in a same storage area, in the set of tasks into a same picking task for outbound delivery processing.

In a second aspect, some embodiments of the present disclosure provide a warehouse system for items, including: a plurality of storage areas, and an operation area provided in matching with the plurality of storage areas, where: each storage area in the plurality of storage areas includes a plurality of shelf groups consisting of a plurality of shelves arranged in a circular shape, each shelf group in the plurality of shelf groups is rotatable in a same direction as a whole driven by a drive apparatus, and each shelf is provided with a plurality of storage positions; and the operation area is provided with a conveying apparatus for conveying a crate in and out of the operation area, and the crate is used to receive to-be-delivered items determined by an operator performing a picking task on a delivering shelf rotated to a preset position.

In a third aspect, some embodiments of the present disclosure provide a method for controlling a warehouse system, including: determining a shelf indicated by a received picking task, where to-be-delivered items represented by the picking task are stored in a same shelf in a same storage area; rotating, by using a drive apparatus, a shelf group to which the shelf indicated by the picking task belongs, so that the shelf indicated by the picking task is rotated to a preset position to become an outbound delivering shelf, to instruct an operator to pick the to-be-delivered items in the delivering shelf, represented by the picking task, into a crate; and conveying, in response to determining that the crate receives the to-be-delivered items represented by the picking task, the to-be-delivered items out of storage by using a conveying apparatus.

In a fourth aspect, some embodiments of the present disclosure provide an apparatus for outbound delivering an item, including: a first determining unit, configured to determine, in response to receiving a set of tasks comprising a plurality of outbound delivering tasks, in a plurality of storage areas, a storage position of a to-be-delivered item in each outbound delivering task in the set of tasks; a second determining unit, configured to determine, from the plurality of storage areas, a target storage area corresponding to the set of tasks based on storage positions of to-be-delivered items in the outbound delivering tasks; a third determining unit, configured to determine, from the target storage area, target storage positions of the to-be-delivered items in the outbound delivering tasks; and an outbound delivering unit, configured to classify the to-be-delivered items, target storage positions of which belonging to a same shelf in a same storage area, in the set of tasks into a same picking task for outbound delivery processing.

In a fifth aspect, some embodiments of the present disclosure provide an apparatus for controlling a warehouse system, including: a fourth determining unit, configured to determine a shelf indicated by a received picking task, wherein to-be-delivered items represented by the picking task are stored in a same shelf in a same storage area; a drive unit, configured to rotate, by using a drive apparatus, a shelf group to which the shelf indicated by the picking task belongs, so that the shelf indicated by the picking task is rotated to a preset position to become a outbound delivering shelf, to instruct an operator to pick the to-be-delivered items represented by the picking task in the delivering shelf into a crate; and a conveying unit, configured to convey, in response to determining that the crate receives the to-be-delivered items represented by the picking task, the to-be-delivered items out of a warehouse by using a conveying apparatus.

In a sixth aspect, some embodiments of the present disclosure provide a computer readable medium, storing a computer program thereon, wherein, the computer program, when executed by a processor, implements the method according to any one of the embodiments described in the first and third aspect.

In a seventh aspect, some embodiments of the present disclosure provide an electronic device, the electronic device includes: one or more processors; and a storage apparatus, storing one or more programs thereon, where the one or more programs, when executed by the one or more processors, cause the one or more processors to implement the method according to any one of the embodiments described in the first and third aspect.

BRIEF DESCRIPTION OF THE DRAWINGS

By reading detailed descriptions of non-limiting embodiments with reference to the following accompanying drawings, other features, objectives, and advantages of the present disclosure will become more apparent.

DETAILED DESCRIPTION OF THE INVENTION

Embodiments of the present disclosure will be further described in detail below in conjunction with the accompanying drawings. It may be understood that the specific embodiments described herein are intended only to explain the relevant disclosure, rather than limiting the disclosure. In addition, it should also be noted that, for ease of description, only those parts that are relevant to the relevant disclosure are shown in the accompanying drawings.

It should be noted that the embodiments of the present disclosure and features in the embodiments may be combined with each other on a non-conflict basis. Embodiments of the present disclosure will be described in detail with reference to the accompanying drawings.

Figure 1:
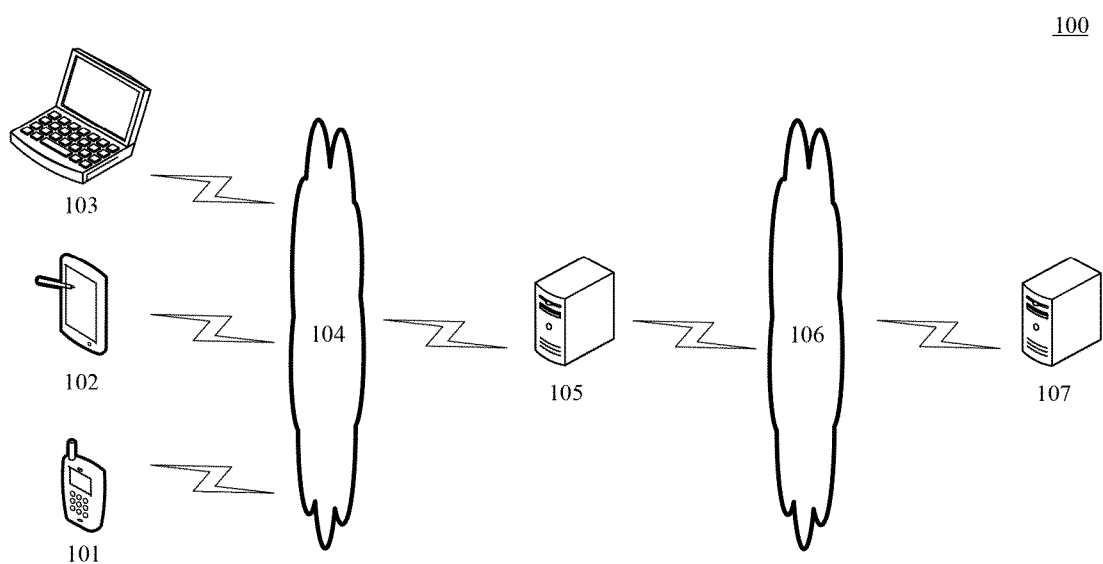
FIG. 1 is an exemplary system architecture diagram to which an embodiment of the present disclosure may be applied.

FIG. 1 shows an exemplary architecture 100 to which a method and apparatus for outbound delivering an item of the present disclosure may be applied.

As shown in FIG. 1, the system architecture 100 may include terminal device(s) 101, 102, 103, a network 104, a server 105, a network 106, and a server 107. The networks 104, 106 serve as mediums providing communication links between the terminal device(s) 101, 102, 103 and the server 105, and between the server 105 and the server 107. The networks 104, 106 may include various types of connections, such as wired or wireless communication links, or optical cables.

The terminal device(s) 101, 102, 103 may be hardware device(s) or software that support network connection and thus perform data interaction and data processing. When the terminal devices 101, 102, 103 are hardware, they may be various electronic devices that support network connection, information interaction, display, processing, and other functions, including but not limited to smartphones, tablet computers, e-book readers, laptops, and desktop computers, and so on. When the terminal devices 101, 102, 103 are software, they may be installed in the above-listed electronic devices. The terminal devices 101, 102, 103 may be implemented as, for example, a plurality of software or software modules used to provide distributed services, or as a single software or software module, which is not limited herein.

The servers 105, 107 may be servers that provide various services, for example, the server 105 is a backend processing server that receives order placement operations from users on the terminal device(s) 101, 102, 103 for processing to obtain outbound delivering tasks of corresponding orders; and the server 107 is a backend processing server that performs delivering operations based on the outbound delivering tasks sent by the server 105. The backend processing server determines, in response to receiving a set of tasks including a plurality of delivering tasks, in a plurality of storage areas, storage positions of to-be-delivered items in each outbound delivering task in the set of tasks; determines, from the plurality of storage areas, a target storage area corresponding to the set of tasks, based on the storage positions of the to-be-delivered items in each outbound delivering task; determines, from the target storage area, target storage positions of the to-be-delivered items in each outbound delivering task; and classifies to-be-delivered items, target storage positions of which belonging to a same shelf in a same storage area, in the set of tasks into a same picking task for outbound delivery processing. For example, the servers 105, 107 may be cloud servers.

It should be noted that the servers may be hardware or software. When the servers are hardware, they may be implemented as a distributed server cluster consisting of a plurality of servers, or as a single server. When the servers are software, they may be implemented as a plurality of software or software modules (e.g., software or software modules used to provide distributed services), or as a single software or software module, which is not limited herein.

It should also be noted that the method for outbound delivering an item provided by embodiments of the present disclosure may be performed by the server; accordingly, parts (e.g., units, subunits, modules, submodules) included in the apparatus for outbound delivering an item may all be provided in the server.

It should be understood that the numbers of terminal devices, networks, and servers in FIG. 1 are merely illustrative. Any number of terminal devices, networks, and servers may be provided according to implementation needs. When an electronic device on which the method for delivering an item runs does not require data transmission with other electronic devices, the system architecture may include only the electronic device (e.g., server or terminal device) on which the method for delivering an item runs.

Figure 2:
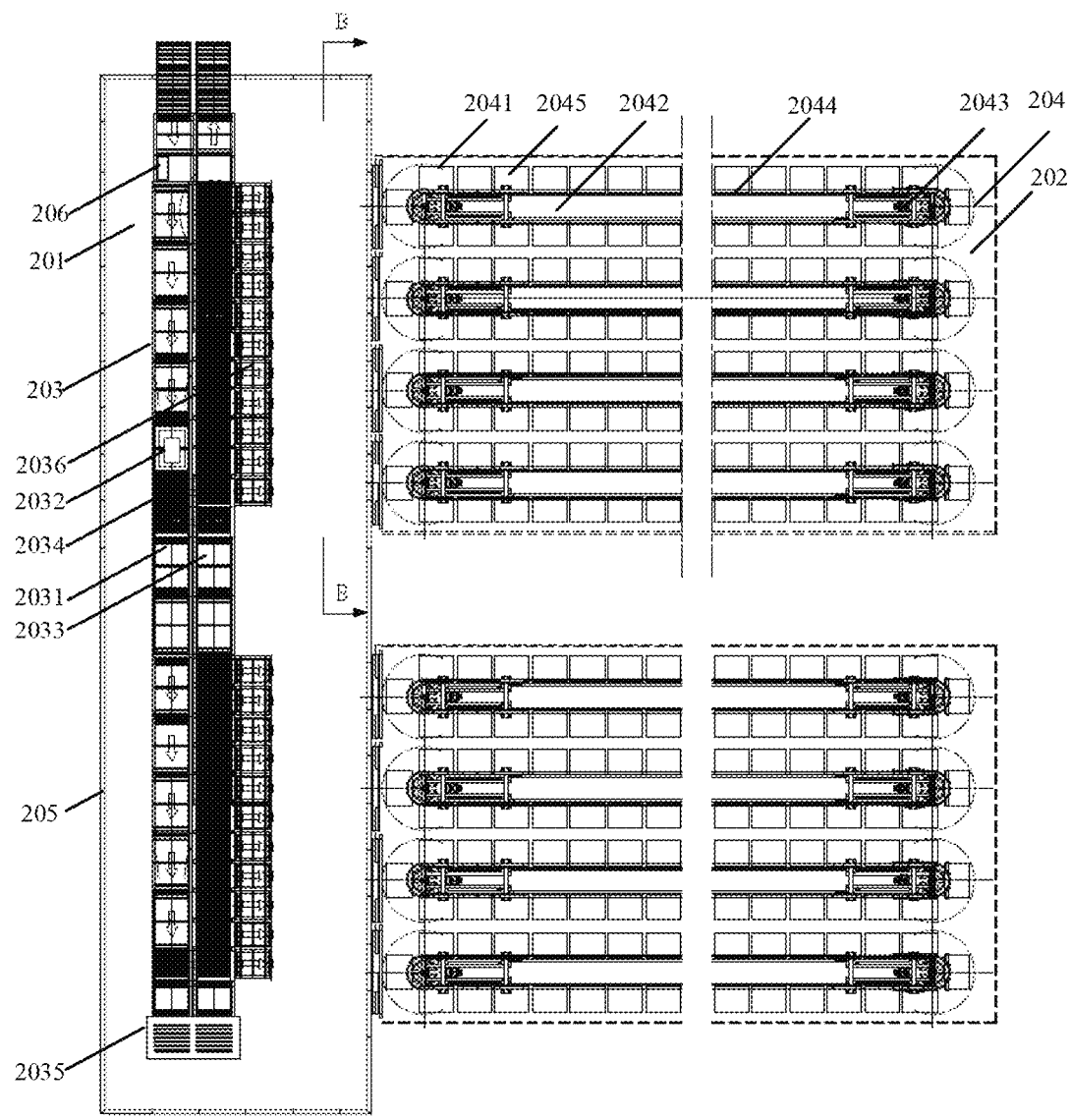
FIG. 2 is a schematic structural diagram of a warehouse system for items according to an embodiment of the present disclosure.

With further reference to FIG. 2, illustrating a warehouse system 200 matching the method for outbound delivering an item of an embodiment of the present disclosure. The warehouse system 200 matches with the method for outbound delivering an item of the present disclosure to perform the operation of outbound delivering an item.

As shown in FIG. 2, the warehouse system 200 is provided with a plurality of storage areas 202 and an operation area 201 matching the plurality of storage areas, where the operation area 201 is used to provide a comfortable operating environment for an operator, and a variety of items are stored in the storage area 202. As an example, there are various fresh items stored frozen in the storage areas. The operation area 201 and the storage areas 202 may be separated from each other by a thermal insulating wall.

Figure 3A:
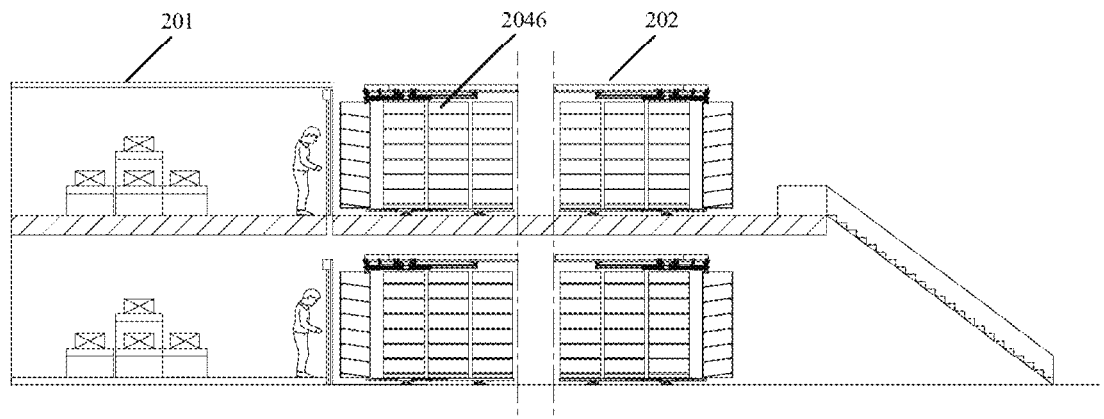
FIG. 3A is a schematic structural diagram of a multi-level warehouse system according to an embodiment of the present disclosure.

As shown in FIG. 3A, the operation area 201 and the storage area 202 may both be multiple, and the multiple operation areas 201 and the multiple storage areas 202 may be set up in separate areas and on separate floors. The multiple operation areas 201 and the multiple storage areas 202 may be set up in one-to-one correspondence, or one operation area 201 may be set up in correspondence with multiple storage areas 202. For example, in FIG. 2, one operation area 201 is set up in correspondence with two storage areas 202.

Each operation area 201 is provided with a conveying apparatus 203 for conveying to-be-delivered items. The conveying apparatus 203 conveys a crate 2032 to the operation area 201 via a conveying line inlet line 2031 and, after receiving the to-be-delivered items, conveys the crate 2032 out of the operation area 201 via a conveying line outlet line 2033. The conveying line inlet line 2031 and the conveying line outlet line 2033 constitute a conveying line of the conveying apparatus. Here, on the conveying line inlet line 2031 or the conveying line outlet line 2033, steering of the crate is performed by using a jacking and transferring apparatus 2034, and conveying of the crate between the conveying apparatuses in the operation areas 201 on different floors is performed by using a hoist 2035.

For convenience of operation, a plurality of cache lane entrances 2036 for temporarily storing the crate may be provided adjacent to the conveying line 2033. After the crate enters a corresponding cache lane entrance under control of the jacking and transferring apparatus 2034, after an operator takes out the to-be-delivered items from a delivering shelf in the storage area 202, the operator may place the to-be-delivered items in the crate 2032 at the cache lane entrance 2036, and then the to-be-delivered items is conveyed out through the crate 2032.

In order to improve a conveying efficiency of the conveying apparatus, during conveying of the crate, a crate identifier on the crate is scanned by using a scanning apparatus 206 provided on the conveying line to bind the crate to a target cache lane entrance in the plurality of cache lane entrances and to bind the crate to a picking task, indicating that the crate may enter the target cache lane entrance under the drive of the jacking and transferring apparatus to perform the bound picking task. For example, the conveying apparatus may be controlled to automatically convey an empty crate; a barcode scanner may be controlled to scan the barcode on the outside of the crate passing the barcode scanner in order to identify different crates to complete registration; the crate is bound to a picking task and a cache lane entrance; the conveying apparatus conveys the crate to the location of the target cache lane entrance that is bound to the crate, and information about arrival of the crate at the target cache lane entrance is fed back to an executing body of the method of the present disclosure (e.g., the server 107 in FIG. 1).

Each cache lane entrance may be provided with a corresponding electronic tag and a control button, by using the electronic tag, information of the to-be-delivered items of the picking task corresponding to the bound crate may be displayed, after completing the picking task corresponding to the crate, the operator may confirm the information of the to-be-delivered items through the control button, as well as feed back the abnormal information when there is abnormal information (such as that there is a difference between items picked from the storage area and items should be picked corresponding to the picking task).

Each storage area 202 is provided with a plurality of shelf rotation systems 204, each shelf rotation system 204 includes a shelf group 2041 and a drive apparatus (including a power apparatus 2043 and a transmission apparatus 2044) for controlling the shelf group 2041 to rotate around an aisle 2042. Here, each shelf group 2041 includes a plurality of shelves 2045. Each shelf 2045 is provided with a plurality of laminates, the laminates divide the shelf into a plurality of storage levels, and each storage level is provided with a plurality of storage positions 2046 for storage of items of different categories.

Figure 3B:
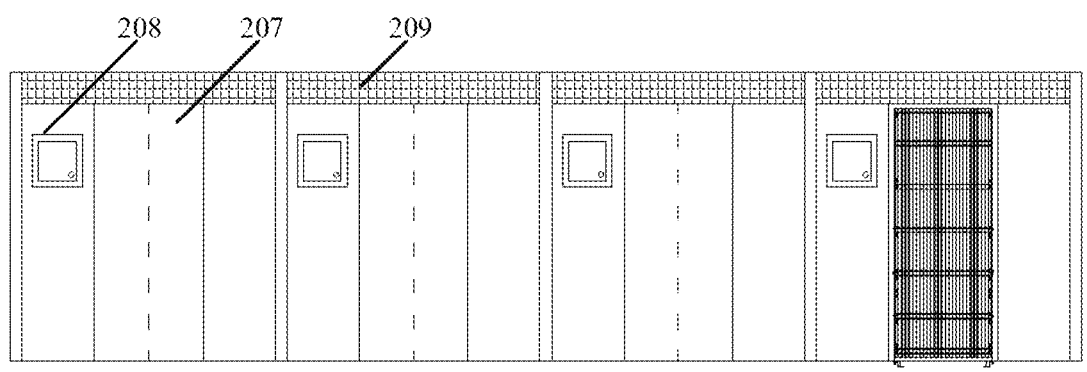
FIG. 3B is a schematic B-B cross-sectional view of FIG. 1.

As shown in FIG. 3B (B-B cross-sectional view of FIG. 2), based on convenience of operation, a plurality of automatic doors 207 that can automatically open and close are provided on the thermal insulating wall between the operation area 201 and the storage area 202, and the plurality of automatic doors correspond to the plurality of shelf groups 2041 in the storage area 202. When the shelf corresponding to the picking task rotates to the automatic door, the automatic door opens and the operator picks the to-be-delivered items and places the to-be-delivered items to the corresponding cache lane entrance.

Corresponding to each automatic door, a preset display 208 may be set to display item information (item name, number of items on the shelf, specification and models of items, commodity code, etc.) of all items on the shelf, corresponding shelf levels and storage position information. Through the information displayed on the preset display, the operator may conveniently learn the item information on the delivering shelf, thus improving operation efficiency.

In the present embodiment, corresponding to each automatic door, an air curtain 209 may be provided to reduce temperature exchange between the operation area 201 and the storage area 202 when the automatic door opens.

Figure 4:
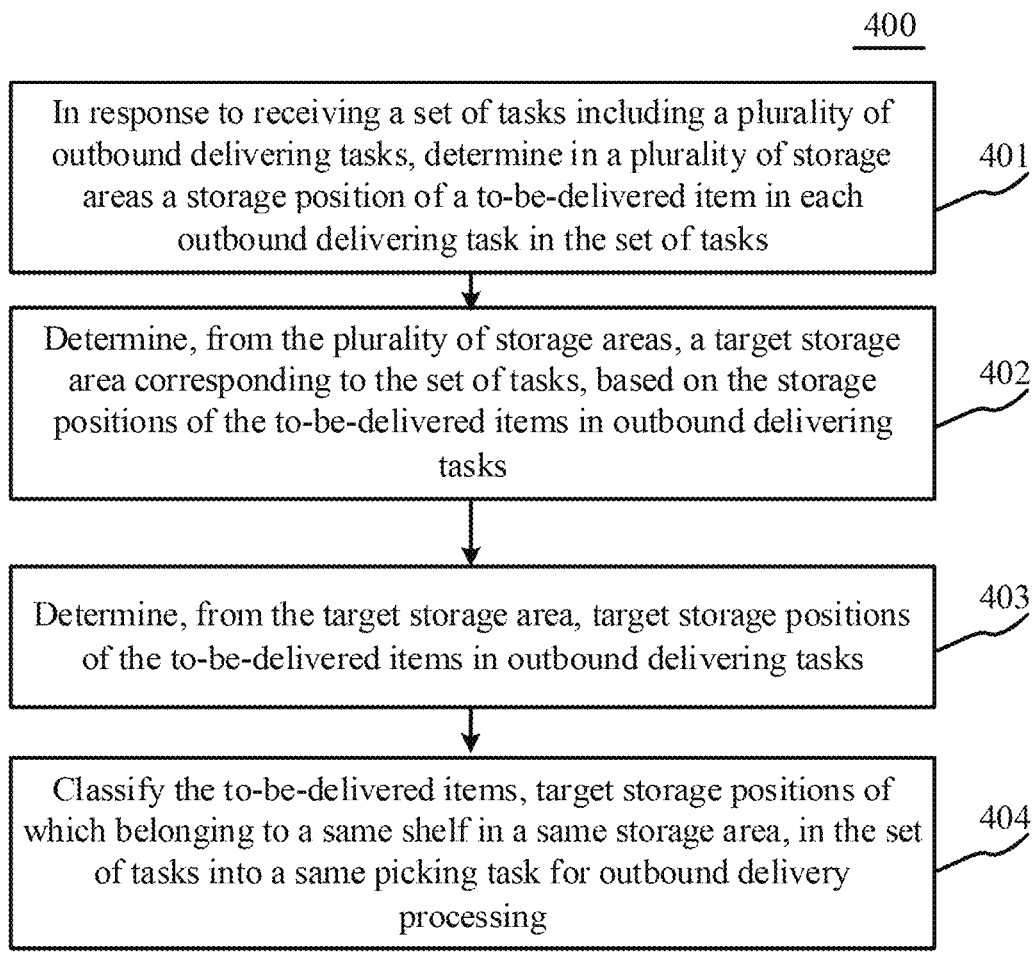
FIG. 4 is a flowchart of a method for outbound delivering an item according to an embodiment of the present disclosure.

With further reference to FIG. 4, illustrating a flow 400 of an embodiment of the method for delivering an item, including the following steps:

Step 401, determining, in response to receiving a set of tasks including a plurality of outbound delivering tasks, in a plurality of storage areas, a storage position of a to-be-delivered item in each outbound delivering task in the set of tasks.

In the present embodiment, an executing body of the method for outbound delivering an item (e.g., the server 107 in FIG. 1) may determine, in response to receiving the set of tasks including the plurality of outbound delivering tasks, in the plurality of storage areas, a storage position of a to-be-delivered item in each outbound delivering task in the set of tasks.

As an example, a warehouse control system (WCS) is provided in the executing body, and the WCS system may receive a set of tasks including a plurality of outbound delivering tasks sent by a superior server (e.g., the server 105 in FIG. 1). Each outbound delivering task may include information of to-be-delivered item(s), including but not limited to information such as names of to-be-delivered item(s), or numbers of to-be-delivered items.

The executing body, or an electronic device communicatively connected to the executing body, stores information of item on each storage position in a delivering device. After acquiring the plurality of outbound delivering tasks in the set of tasks, the executing body may determine the storage position(s) of the to-be-delivered item(s) in each outbound delivering task based on the to-be-delivered item information in each outbound delivering task. It may be understood that the items of a same type may be stored in different storage positions in different storage areas.

Step 402, determining, from the plurality of storage areas, a target storage area corresponding to the set of tasks, based on the storage positions of the to-be-delivered items in outbound delivering tasks.

In the present embodiment, the executing body may determine, from the plurality of storage areas, the target storage area(s) corresponding to the set of tasks, based on the storage position(s) of the to-be-delivered item(s) in each outbound delivering task determined in step 201. The target storage area(s) corresponding to the set of tasks represents storage area(s) that is/are capable of satisfying the outbound delivering requirements represented by the set of tasks. The delivering requirements include information such as item names of the to-be-delivered items, number of the to-be-delivered items.

As an example, first, the executing body determines, for each outbound delivering task in the set of tasks, a storage area that satisfies this outbound delivering task. Then, the executing body performs the following predefined operation until remaining outbound delivering tasks are zero: determining, in the remaining outbound delivering tasks in the set of tasks, a storage area that satisfies a maximum number of outbound delivering tasks as an intended storage area, and determining outbound delivering tasks that cannot be satisfied by the intended storage area as remaining outbound delivering tasks for a next predefined operation. In the first predefined operation, the "remaining outbound delivering tasks" refers to all the outbound delivering tasks in the set of tasks. Finally, determining the intended storage area for each determination operation as a target storage area.

In some alternative implementations of the present embodiment, the executing body performs the above step 402 as follows: for each type of to-be-delivered items corresponding to the set of tasks, determining remaining shelf lives of the to-be-delivered items of the each type in storage areas where the to-be-delivered items of the each type is stored; and determining, based on the remaining shelf lives of the to-be-delivered items of the each type, the target storage area corresponding to the set of tasks.

In this implementation, the executing body may: determining priority levels of to-be-delivered items of the each type, based on the remaining shelf lives of the to-be-delivered items of the each type, where, for each type of to-be-delivered items, the priority levels of the to-be-delivered items of the each type are negatively correlated with the remaining shelf lives of to-be-delivered items of the each type; and determining the target storage area corresponding to the set of tasks, based on the priority levels of the to-be-delivered items of the each type.

As an example, for each type of to-be-delivered items, the executing body determines a storage area that satisfies the to-be-delivered items in the set of tasks according to the priority levels in an descending order.

In some alternative implementations of the present embodiment, the executing body performs the above step 402 as follows: determining, from the plurality of storage areas, a minimum number of storage areas that satisfy delivering requirements represented by the set of tasks; and determining, in response to determining that the minimum number is one, the storage area corresponding to the minimum number as the target storage area corresponding to the set of tasks.

As an example, when the storage areas A and B in storage areas A, B, C, and D both can individually satisfy the delivering requirements of a task set G, then it is determined that the minimum number is one; when none of the storage areas A, B, C and D is capable of individually satisfying the delivering requirements of the task set G, however, a combination of the storage areas A and B and/or a combination of the storage areas A and C can satisfy the delivering requirements of the task set G, then the minimum number is two.

In some alternative implementations of the present embodiment, the plurality of storage areas are on different floors. The executing body performs the above step 402 as follows: in response to determining that the minimum number is greater than one, determining, from at least one storage area group, storage areas in a storage area group that is on a same floor as target storage areas corresponding to the set of tasks, where each storage area group in the at least one storage area group includes storage areas of the minimum number, and each storage area group is capable of satisfying the delivering requirements represented by the set of tasks.

Continuing with the example that the combination of the storage areas A and B and the combination of the storage areas A and C each is capable of satisfying the delivering requirements of the task set G, the storage area groups include a storage area group composed of the storage areas A and B and a storage area group composed of the storage areas A and C. When the storage areas A and B are located on the same floor while the storage areas A and C are located on different floors, the storage area group composed of the storage areas A and B is selected as a target storage area group, and the storage areas A and B are selected as the target storage areas.

In some alternative implementations of the present embodiment, the executing body performs the above step 402 as follows: in response to determining that there is no storage area group that is on the same floor in the at least one storage area group, determining an operational cost for each storage area group to complete the delivering tasks in the set of tasks; and determining a target storage area group based on the operational cost for each storage area group, and determining storage areas in the target storage area group as the target storage areas.

The following aspects may be considered in determining the operational cost: the picking task being performed in the storage area, picking tasks represented by the set of tasks, an operational cost of the hoist, and a conveying cost. The executing body may set a corresponding weight for each of the above aspects in order to accurately determine the operational cost.

Step 403, determining, from the target storage area, target storage positions of the to-be-delivered items in outbound delivering tasks.

In the present embodiment, the executing body may determine, from the target storage area determined in step 402, the target storage positions of the to-be-delivered items in outbound delivering tasks.

As an example, for each type of to-be-delivered item, when there is only one storage position in the target storage area storing the type of to-be-delivered item, the only one storage position may be set as the target storage position directly; when there are multiple storage positions in the target storage area storing the type of to-be-delivered item, one of the storage positions may be randomly set as the target storage position.

In some alternative implementations of the present embodiment, the executing body performs the above step 403 as follows: for each type of to-be-delivered item in the set of tasks, performing operations as follows: determining a to-be-delivered number of to-be-delivered items of the type in the plurality of outbound delivering tasks; and determining, in the target storage area as the target storage position of the type of to-be-delivered item, where a storage position on which the type of to-be-delivered item is stored, an inventory of the type of to-be-delivered item at the storage position is greater than the to-be-delivered number of the type of to-be-delivered item, and the inventory of the type of to-be-delivered item at the storage position is closest to the to-be-delivered number of the to-be-delivered item.

In some alternative implementations of the present embodiment, as shown in FIG. 2, a shelf in each of the plurality of storage areas include a plurality of shelf levels. The executing body performs the above step 403 as follows: determining the target storage positions of the to-be-delivered items according to priority levels of the plurality of shelf levels of each shelf in the target storage area, where the priority levels of the plurality of shelf levels of each shelf decreases from a middle shelf level to both ends.

As an example, in the case where the number of shelf levels u is even, the highest shelf level has the lowest priority, e.g., the priority levels may be set as: X(roundup(u/2))>X(roundup(u/2)+1)>X(roundup(u/2)−1)>X(roundup(u/2)+2)>X(roundup(u/2)−2) . . . >Xu, roundup( ) represents rounding up. For example, if the number of shelf levels is even u=6, then the priority levels may be set as: X3>X4>X2>X5>X1>X6.

As another example, in the case where the number of shelf levels u is odd, the lowest shelf level has the lowest priority, e.g., the priority levels may be set as: X(roundup(u/2))>X(roundup(u/2)+1)>X(roundup(u/2)−1)>X(roundup(u/2)+2)>X(roundup(u/2)−2) . . . >X1. For example, if the number of shelf levels is odd u=5, then the priority levels may be set as: X3>X4>X2>X5>X1.

Thus, shelf levels in the middle of a shelf are of moderate height, prioritizing storage positions on these shelf levels as the target storage positions can improve a delivering efficiency.

In some alternative implementations of the present embodiment, as shown in FIG. 2, a plurality of shelves in each of the plurality of storage areas are arranged in a circular shape to form a plurality of shelf groups, each shelf group in the plurality of shelf groups is rotatable in a same direction as a whole, so that a shelf rotated to a preset position is selected as a delivering shelf.

As an example, the preset position may be a position corresponding to the automatic door as shown in FIG. 2, and a shelf on the shelf group rotating to the automatic door position may be used as the delivering shelf.

The executing body performs the above step 403 as follows: performing determination operations based on the storage positions of to-be-delivered items of each type in the target storage area corresponding to the set of tasks as follows: determining a target shelf on which a largest variety types of the current to-be-delivered items stored, and determining remaining to-be-delivered items as current to-be-delivered items in a next determination operation; and determining, for each type of to-be-delivered item, a storage position of the to-be-delivered item on the corresponding target shelf as the target storage position for the to-be-delivered item. The "current to-be-delivered items" in the first determination operation are all of the to-be-delivered items included in the set of tasks.

Thus, as many to-be-delivered items may be outbound delivered during one rotation of the target shelf.

In some alternative implementations of the present embodiment, the executing body may: determining, based on an order in which the shelves in a shelf group in the target storage area are arranged, priority levels of the shelves; and determining the target storage positions for the to-be-delivered items in each delivering task according to the priority levels of the shelves. For example, it is possible to allocate outbound delivering storage positions according to the strategy: priority level of L1>priority level of L2> . . . >priority level of LK, with K being the total number of shelves in the shelf group. In this way, it may also ensure that as many to-be-delivered items are picked for outbound delivering in as few turns as possible rotating the shelves.

Step 404, classifying the to-be-delivered items, target storage positions of which belonging to a same shelf in a same storage area, in the set of tasks into a same picking task for outbound delivery processing.

In the present embodiment, the executing body may classify the to-be-delivered items, the target storage positions of which belonging to the same shelf in a same storage area, in the set of tasks into a same picking task for outbound delivery processing.

The to-be-delivered items in the same shelf are classified into the same picking task, i.e., by performing one picking task on an outbound delivering shelf, at least one to-be-delivered item on the outbound delivering shelf involving the set of tasks may be outbound delivered, improving the delivering efficiency of the to-be-delivered items.

In some alternative implementations of the present embodiment, the executing body may: binding the picking task to a crate and binding the picking task to a shelf corresponding to the picking task; and rotating a shelf group in which the shelf corresponding to the picking task is located, so that the shelf corresponding to the picking task is rotated to the preset position to become the outbound delivering shelf.

In some alternative implementations of the present embodiment, the executing body may: in response to determining that the shelf corresponding to the picking task is rotated to the preset position to become the outbound delivering shelf, instructing through a preset display a preset personnel to pick the to-be-delivered items from the outbound delivering shelf indicated by the picking task to the crate, to convey the to-be-delivered items indicated by the picking task.

In some alternative implementations of the present embodiment, the executing body may: scanning item identifiers of the to-be-delivered items on the outbound delivering shelf, and displaying item information of the scanned to-be-delivered items by presetting in an electronic tag of a target cache lane entrance.

With further reference to FIG. 2, when the shelf corresponding to the picking task rotates to the automatic door position to become the outbound delivering shelf, the automatic door opens, the preset display which is set corresponding to the automatic door displays logistics property information of all items on the outbound delivering shelf, and the preset personnel picks the to-be-delivered items from the outbound delivering shelf indicated by the picking task to the crate, to convey the to-be-delivered items indicated by the picking task out of the warehouse.

In some alternative implementations of the present embodiment, during outbound delivering, for each shelf group of the plurality of shelf groups in the target storage area, the executing body may determine a rotation direction of the shelf group, according to a principle of shortest rotation distance of the shelf group based on a current position of the outbound delivering shelf.

For example, a shelf group is composed of 60 shelves which are L1 to L60 in sequence in clockwise order. The shelf on which the target storage position is located is L4, and the current outbound delivering shelf is L10.

In this case, if an item in L4 needs to be outbound delivered, the rotation distances are L11-L60 and L1-L4 when rotating in clockwise, and the rotation distance is L4-L9 when rotating in counterclockwise. Therefore, based on the principle of shortest distance, counter-clockwise rotating the shelf is selected for delivery processing.

Figure 5:
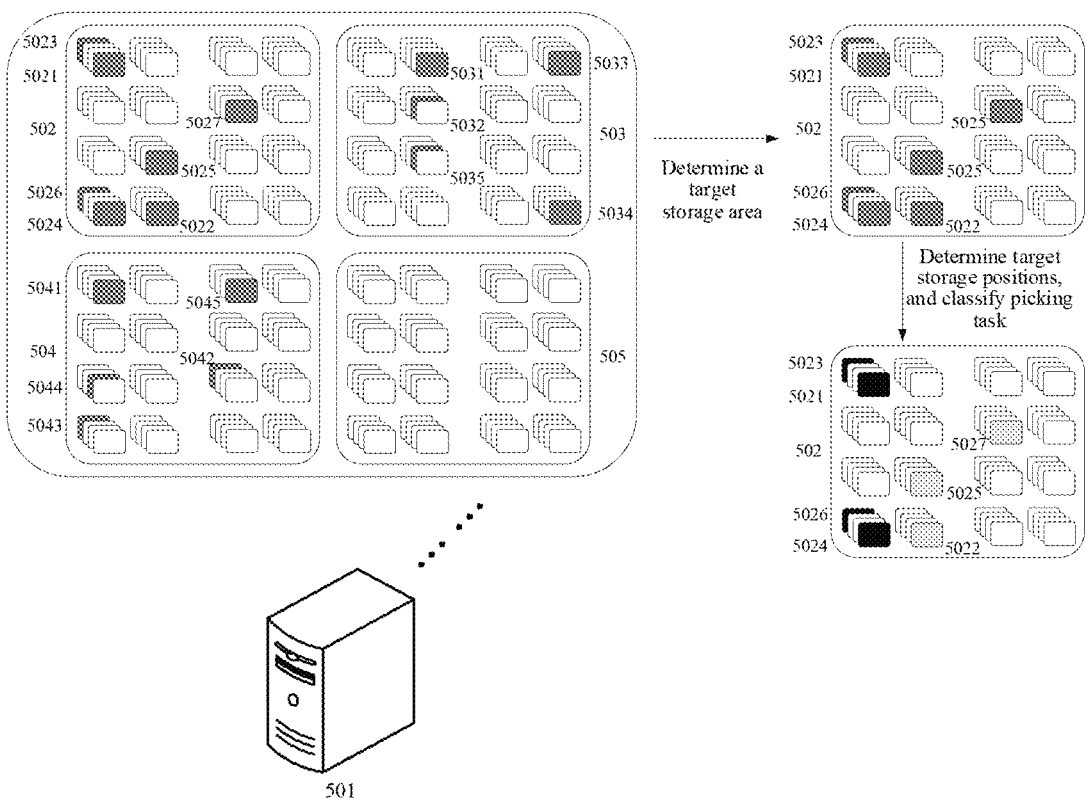
FIG. 5 is a schematic diagram of an application scenario of the method for outbound delivering an item according to an embodiment of the present embodiment.

With further reference to FIG. 5, FIG. 5 is a schematic diagram 500 of an application scenario of the method for outbound delivering an item according to the present embodiment. In the application scenario of FIG. 5, a server 501 receives a set of tasks including a plurality of outbound delivering tasks, where an outbound delivering task A includes to-be-delivered items a, b, and c, and an outbound delivering task B includes to-be-delivered items a, c, and d. The server 501, in response to receiving the set of tasks including the plurality of outbound delivering tasks, determines in a plurality of storage areas 502, 503, 504, 505, storage positions for the to-be-delivered items in each outbound delivering task in the set of tasks, where the storage area 502 includes storage positions 5021, 5022 for the to-be-delivered item a, a storage position 5023 for the to-be-delivered item b, storage positions 5024, 5025 for the to-be-delivered item c, and storage positions 5026, 5027 for the to-be-delivered item d. The storage area 503 includes storage positions 5031, 5032 for the to-be-delivered item a, a storage position 5033 for the to-be-delivered item b, and storage positions 5034, 5035 for the to-be-delivered item c. The storage area 504 includes storage positions 5041, 5042 for the to-be-delivered item a, a storage position 5043 for the to-be-delivered item b, and storage positions 5044, 5045 for the to-be-delivered item d. The storage area 505 does not include storage positions for the to-be-delivered items a, b, c, and d.

The server 501 determines a target storage area 502 corresponding to the set of tasks from the plurality of storage areas 502, 503, 504, 505 based on the storage positions for the to-be-delivered items in each outbound delivering task; and determines from the target storage area 502, target storage positions of the to-be-delivered items in each outbound delivering task, i.e., the storage position 5021 for the to-be-delivered item a, the storage position 5023 for the to-be-delivered item b, the storage position 5024 for the to-be-delivered item c, and the storage position 5026 for the to-be-delivered item d. Finally, the server 501 classifies the to-be-delivered items a and b in the set of tasks into a same picking task, where the target storage positions of the to-be-delivered items a and b belongs to a same shelf in the same storage area 502, and classifies the to-be-delivered items c and d on the same shelf into a same picking task, for outbound delivery processing.

The method for outbound delivering an item provided by the above embodiment of the present disclosure, determining, in response to receiving a set of tasks including a plurality of outbound delivering tasks, in a plurality of storage areas, a storage position of a to-be-delivered item in each outbound delivering task in the set of tasks; determining, from the plurality of storage areas, a target storage area corresponding to the set of tasks, based on the storage positions of the to-be-delivered items in outbound delivering tasks; determining, from the target storage area, target storage positions of the to-be-delivered items in outbound delivering tasks; and classifying the to-be-delivered items, the target storage positions of which belonging to a same shelf in a same storage area, in the set of tasks into a same picking task for outbound delivery processing. Thus, with regard to a complicated storage environment where a plurality of storage areas are involved, embodiments of the present disclosure provides a method for outbound delivering an item, improving an efficiency of item outbound delivering.

In some alternative implementations of the present embodiment, the executing body may further: determining the number of to-be-delivered items in the crate; and redetermining, in response to determining that the number of to-be-delivered items in the crate is less than the number of to-be-delivered items represented by the picking task, target storage positions for extra to-be-delivered items for the picking task.

As an example, the executing body may determine whether the number of to-be-delivered items in the crate is less than the number of to-be-delivered items represented by the picking task based on abnormal information entered through the control button by the operator, and when it is determined that the number of to-be-delivered items in the crate is less than the number of to-be-delivered items represented by the picking task, redetermine the target storage positions for the extra to-be-delivered items for the picking task.

In some alternative implementations of the present embodiment, the set of tasks is multiple; and the method further includes: prioritizing a set of tasks for outbound delivery processing, in response to determining that the set of tasks satisfies at least one of following circumstances: time information corresponding to the set of tasks satisfying a preset time threshold; the set of tasks including an delivery processing operation that requires cooperation of a preset personnel; the set of tasks including the to-be-delivered items stored in a plurality of storage areas; a ratio of a to-be-delivered number of all to-be-delivered items included in the set of tasks to the number of types of the to-be-delivered items satisfying a preset ratio threshold; and/or the number of shelves corresponding to the set of tasks being less than a preset number threshold.

As an example, the preset time threshold may be a time threshold set based on a wave cut-off time node of the outbound delivering tasks. For example, if the wave cut-off time is 11:00, the set of tasks may be prioritized for outbound processing when the outbound delivering tasks in the set of tasks are outbound delivering tasks determined before 11:00.

In some alternative implementations of the present embodiment, the executing body may further: determining whether there is a relay task for the crate, where the relay task is used to represent that there is a to-be-delivered item from a storage area other than the target storage area that requires to be conveyed by the crate; and conveying, in response to determining that there is the relay task for the crate, the crate to the storage area corresponding to the relay task.

Figure 6:
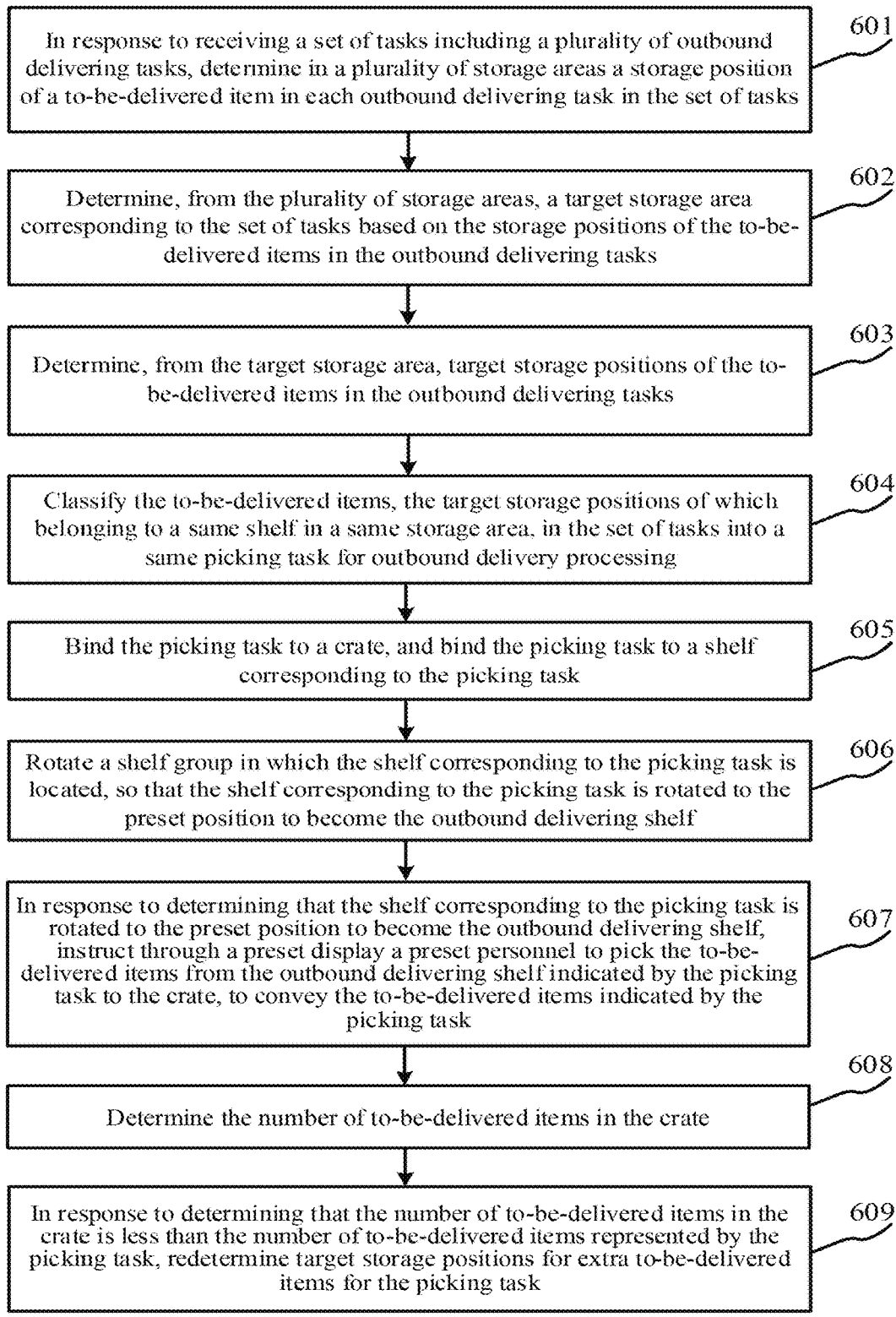
FIG. 6 is a flowchart of the method for outbound delivering an item according to another embodiment of the present disclosure.

With further reference to FIG. 6, illustrating a schematic flow 600 of the method for outbound delivering an item according to another embodiment of the present disclosure, including the following steps:

Step 601, in response to receiving a set of tasks including a plurality of outbound delivering tasks, determining in a plurality of storage areas, a storage position of a to-be-delivered item in each outbound delivering task in the set of tasks.

Step 602, determining, from the plurality of storage areas, a target storage area corresponding to the set of tasks, based on the storage positions of the to-be-delivered items in the outbound delivering tasks.

Step 603, determining, from the target storage area, target storage positions of the to-be-delivered items in the outbound delivering tasks.

Step 604, classifying the to-be-delivered items, the target storage positions of which belonging to a same shelf in a same storage area, in the set of tasks into a same picking task for outbound delivery processing.

Step 605, binding the picking task to a crate, and biding the picking task to a shelf corresponding to the picking task.

Step 606, rotating a shelf group in which the shelf corresponding to the picking task is located, so that the shelf corresponding to the picking task is rotated to the preset position to become the outbound delivering shelf.

Step 607, in response to determining that the shelf corresponding to the picking task is rotated to the preset position to become the outbound delivering shelf, instructing through a preset display a preset personnel to pick the to-be-delivered items from the outbound delivering shelf indicated by the picking task to the crate, to convey the to-be-delivered items indicated by the picking task.

Step 608, determining the number of to-be-delivered items in the crate.

Step 609, redetermining, in response to determining that the number of to-be-delivered items in the crate is less than the number of to-be-delivered items represented by the picking task, target storage positions for extra to-be-delivered items for the picking task.

As can be seen from the present embodiment, the flow 600 of the method for outbound delivering an item in the present embodiment describes in detail the process of delivery processing for the to-be-delivered items compared with the corresponding embodiment of FIG. 4. Thus, the convenience and accuracy of delivering operations in the present embodiment is further improved.

Figure 7:
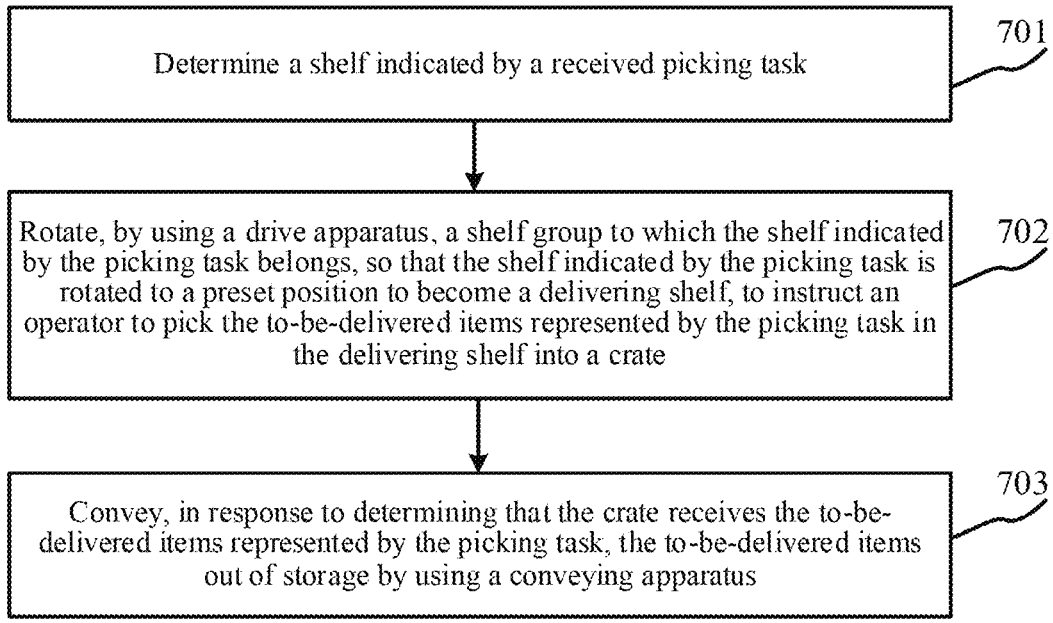
FIG. 7 is a flowchart of a method for controlling a warehouse system according to an embodiment of the present disclosure.

With further reference to FIG. 7, a schematic flow 700 of a method for controlling a warehouse system according to another embodiment of the present disclosure is shown, for controlling a warehouse system as shown in FIGS. 2 and 3, including the following steps:

Step 701, determining a shelf indicated by a received picking task.

In the present embodiment, to-be-delivered items represented by the picking task are stored in a same shelf in a same storage area.

Step 702, rotating, by using a drive apparatus, a shelf group to which the shelf indicated by the picking task belongs, so that the shelf indicated by the picking task is rotated to a preset position to become a delivering shelf, to instruct an operator to pick the to-be-delivered items represented by the picking task in the delivering shelf into a crate.

Step 703, conveying, in response to determining that the crate receives the to-be-delivered items represented by the picking task, the to-be-delivered items out of storage by using a conveying apparatus.

In some alternative implementations of the present embodiment, before performing the above step 702, an executing body of the present embodiment may further: scanning a crate identifier on the crate by using a scanning apparatus in a target operating area, and binding the crate to a target cache lane entrance in a plurality of cache lane entrances, and binding the crate to the picking task, where the target operating area is an operating area corresponding to the storage area where the shelf indicated by the picking task is located; and conveying the crate to the target cache lane entrance by using the conveying apparatus.

In some alternative implementations of the present embodiment, the executing body may further: displaying item information of the to-be-delivered items corresponding to the picking task by using an electronic tag corresponding to the target cache lane entrance; and the instruct an operator to pick the to-be-delivered items represented by the picking task in the delivering shelf into a crate, includes: in response to determining that the shelf indicated by the picking task is rotated to the preset position to become the delivering shelf, controlling an automatic door to open, and displaying item information of items on the delivering shelf through a preset display corresponding to the automatic door.

In some alternative implementations of the present embodiment, the executing body may: scanning item identifiers of the to-be-delivered items on the delivering shelf, and displaying, by a presetting manner, the item information of the scanned to-be-delivered items in the electronic tag of the target cache lane entrance.

Figure 8:
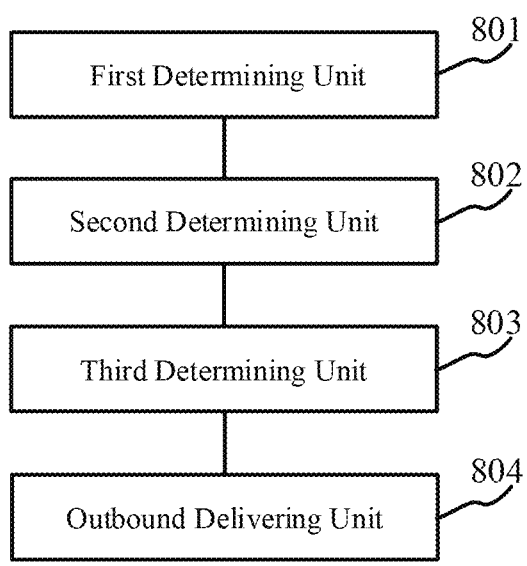
FIG. 8 is a structural diagram of an apparatus for outbound delivering an item according to an embodiment of the present disclosure.

With further reference to FIG. 8, as an implementation of the method shown in the above figures, an embodiment of the present disclosure provides an apparatus for outbound delivering an item, and the apparatus embodiment corresponds to the method embodiment shown in FIG. 4. The apparatus may be applied to various electronic devices.

As shown in FIG. 8, the apparatus for delivering an item includes: a first determining unit 801, configured to determine, in response to receiving a set of tasks comprising a plurality of outbound delivering tasks, in a plurality of storage areas, a storage position of a to-be-delivered item in each outbound delivering task in the set of tasks; a second determining unit 802, configured to determine, from the plurality of storage areas, a target storage area corresponding to the set of tasks based on storage positions of to-be-delivered items in the outbound delivering tasks; a third determining unit 803, configured to determine, from the target storage area, target storage positions of the to-be-delivered items in the outbound delivering tasks; and an outbound delivering unit 804, configured to classify the to-be-delivered items, target storage positions of which belonging to a same shelf in a same storage area, in the set of tasks into a same picking task for outbound delivery processing.

In some alternative implementations of the present embodiment, the second determining unit 802 is further configured to: for each type of to-be-delivered items corresponding to the set of tasks, determine remaining shelf lives of the to-be-delivered items of the each type in storage areas where the to-be-delivered items of the each type are stored; and determine, based on the remaining shelf lives of the to-be-delivered items of the each type, the target storage area corresponding to the set of tasks.

In some alternative implementations of the present embodiment, the second determining unit 802 is further configured to: determine, from the plurality of storage areas, a minimum number of storage areas that satisfy delivering requirements represented by the set of tasks; and determine, in response to determining that the minimum number is one, determining the storage area corresponding to the minimum number as the target storage area corresponding to the set of tasks.

In some alternative implementations of the present embodiment, the plurality of storage areas are on different floors; and the second determining unit 802 is further configured to: in response to determining that the minimum number is greater than one, determine, from at least one storage area group, storage areas in a storage area group that is on a same floor as target storage areas corresponding to the set of tasks, wherein each storage area group in the at least one storage area group comprises storage areas of the minimum number, and each storage area group is capable of satisfying the delivering requirements represented by the set of tasks.

In some alternative implementations of the present embodiment, the second determining unit 802 is further configured to: in response to determining that there is no storage area group that is on the same floor in the at least one storage area group, determine an operational cost for each storage area group to complete the delivering tasks in the set of tasks; and determine a target storage area group based on the operational cost for each storage area group, and determine storage areas in the target storage area group as the target storage areas.

In some alternative implementations of the present embodiment, the third determining unit 803 is further configured to: for each type of to-be-delivered item in the set of tasks, performing operations as follows: determine a to-be-delivered number of the type of to-be-delivered item in the plurality of outbound delivering tasks; and determine, in the target storage area, a storage position in which the type of to-be-delivered item is stored as the target storage position for the to-be-delivered item, wherein an inventory of the type of to-be-delivered item at the target storage position is greater than the to-be-delivered number of the type of to-be-delivered item, and the inventory of the type of to-be-delivered item at the target storage position is closest to the to-be-delivered number of the to-be-delivered item.

In some alternative implementations of the present embodiment, a shelf in each storage area in the plurality of storage areas includes a plurality of shelf levels; and the third determining unit 803 is further configured to: determine the target storage positions of the to-be-delivered items according to priority levels of the plurality of shelf levels of each shelf in the target storage area, wherein the priority levels of the plurality of shelf levels of each shelf decrease from a middle shelf level to both ends.

In some alternative implementations of the present embodiment, a plurality of shelves in each storage area of the plurality of storage areas are arranged in a circular shape and form a plurality of shelf groups, each shelf group in the plurality of shelf groups is rotatable in a same direction as a whole to select a shelf rotated to a preset position as an outbound delivering shelf; and the third determining unit 803 is further configured to: perform determination operations based on the storage positions of types of to-be-delivered items in the target storage area corresponding to the set of tasks as follows: determining a target shelf having a largest variety types of current to-be-delivered items stored thereon, and determining remaining to-be-delivered items as current to-be-delivered items for performing a next determination operation; and for each type of to-be-delivered item, determine a storage position of the to-be-delivered item of the each type on the corresponding target shelf as the target storage position of the to-be-delivered item.

In some alternative implementations of the present embodiment, the apparatus further includes: a fourth determining unit (not shown in the figure), configured to determine, for each shelf group of the plurality of shelf groups in the target storage area, a rotation direction for the shelf group according to a principle of shortest rotation distance of the shelf group and based on a current position of the outbound delivering shelf.

In some alternative implementations of the present embodiment, the outbound delivering unit 804 is further configured to: bind the picking task to a crate, and bind the picking task to a shelf corresponding to the picking task; and rotate a shelf group in which the shelf corresponding to the picking task is located, so that the shelf corresponding to the picking task is rotated to the preset position to become the outbound delivering shelf.

In some alternative implementations of the present embodiment, the apparatus further includes: an instruction unit, configured to instruct, in response to determining that the shelf corresponding to the picking task is rotated to the preset position to become the delivering shelf, through a preset display a preset personnel to pick the to-be-delivered items from the delivering shelf indicated by the picking task to the crate, to convey the to-be-delivered items indicated by the picking task out of the warehouse.

In some alternative implementations of the present embodiment, the apparatus further includes: a redetermining unit (not shown in the figure), configured to determine the number of to-be-delivered items in the crate; and redetermine, in response to determining that the number of to-be-delivered items in the crate is less than the number of to-be-delivered items represented by the picking task, target storage positions for extra to-be-delivered items for the picking task.

In some alternative implementations of the present embodiment, the set of tasks is multiple; and the apparatus further includes: a prioritization unit (not shown in the figure), configured to prioritize the set of tasks for outbound delivery processing, in response to determining that the set of tasks satisfies at least one of following circumstances: time information corresponding to the set of tasks satisfying a preset time threshold; the set of tasks including an delivery processing operation that requires cooperation of the preset personnel; the set of tasks including the to-be-delivered items stored in a plurality of storage areas; a ratio of a to-be-delivered number of all to-be-delivered items included in the set of tasks to the number of types of the to-be-delivered items satisfying a preset ratio threshold; and the number of shelves corresponding to the set of tasks being less than a preset number threshold.

In the present embodiment, in the apparatus for outbound delivering an item, the first determining unit determines, in response to receiving a set of tasks including a plurality of outbound delivering tasks, in a plurality of storage areas, a storage position of a to-be-delivered item in each outbound delivering task in the set of tasks; the second determining unit determines, from the plurality of storage areas, a target storage area corresponding to the set of tasks based on the storage positions of to-be-delivered items in outbound delivering tasks; the third determining unit determines, from the target storage area, target storage positions of the to-be-delivered items in the outbound delivering tasks; and the outbound delivering unit classifies the to-be-delivered items, the target storage positions of which belonging to a same shelf in a same storage area, in the set of tasks into a same picking task for outbound delivery processing. Thus, with regard to a complicated storage environment with a plurality of storage areas involved, embodiments of the present disclosure provide a method for outbound delivering an item, improving an efficiency of item delivering.

Figure 9:
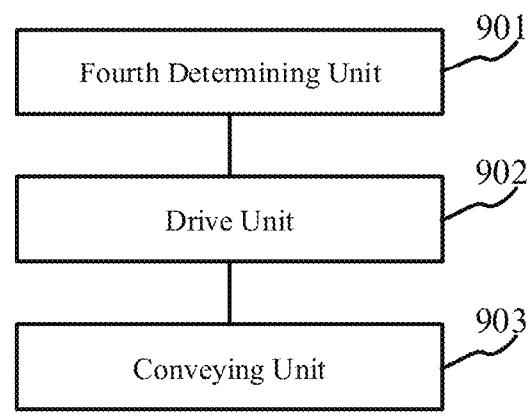
FIG. 9 is a structural diagram of an apparatus for controlling a warehouse system according to an embodiment of the present disclosure.

With further reference to FIG. 9, as an implementation of the method shown in the above figures, an embodiment of the present disclosure provides an apparatus for controlling a warehouse system, and the apparatus embodiment corresponds to the method embodiment shown in FIG. 7. The apparatus may be applied to various electronic devices.

As shown in FIG. 9, the apparatus 900 for controlling a warehouse system includes: a fourth determining unit 901, configured to determine a shelf indicated by a received picking task, where to-be-delivered items represented by the picking task are stored in a same shelf in a same storage area; a drive unit 902, configured to rotate, by using a drive apparatus, a shelf group to which the shelf indicated by the picking task belongs, so that the shelf indicated by the picking task is rotated to a preset position to become an outbound delivering shelf, to instruct an operator to pick the to-be-delivered items represented by the picking task in the delivering shelf into a crate; and a conveying unit 903, configured to convey, in response to determining that the crate receives the to-be-delivered items represented by the picking task, the to-be-delivered items out of a warehouse by using a conveying apparatus.

In some alternative implementations of the present embodiment, the apparatus further includes: a binding unit (not shown in the figure), configured to scan a crate identifier on the crate by using a scanning apparatus in a target operating area, and bind the crate to a target cache lane entrance in a plurality of cache lane entrances, and binding the crate to the picking task, where the target operating area is an operating area corresponding to the storage area where the shelf indicated by the picking task is located; and convey the crate to the target cache lane entrance by using the conveying apparatus.

In some alternative implementations of the present embodiment, the apparatus further includes: a displaying unit (not shown in the figure), configured to display item information of the to-be-delivered items corresponding to the picking task by using an electronic tag corresponding to the target cache lane entrance; and the instruct an operator to pick the to-be-delivered items represented by the picking task in the delivering shelf into a crate, comprises in response to determining that the shelf indicated by the picking task is rotated to the preset position to become the outbound delivering shelf, controlling an automatic door to open, and displaying item information of items on the delivering shelf through a preset display corresponding to the automatic door.

In some alternative implementations of the present embodiment, the drive unit 902 is further configured to: in response to determining that the shelf indicated by the picking task is rotated to the preset position to become the outbound delivering shelf, control an automatic door to open, and display item information of items on the delivering shelf through a preset display corresponding to the automatic door.

In some alternative implementations of the present embodiment, the displaying unit (not shown in the figure) is configured to scan item identifiers of the to-be-delivered items on the delivering shelf, and display, by a presetting manner, the item information of the scanned to-be-delivered items in the electronic tag of the target cache lane entrance.

Figure 10:
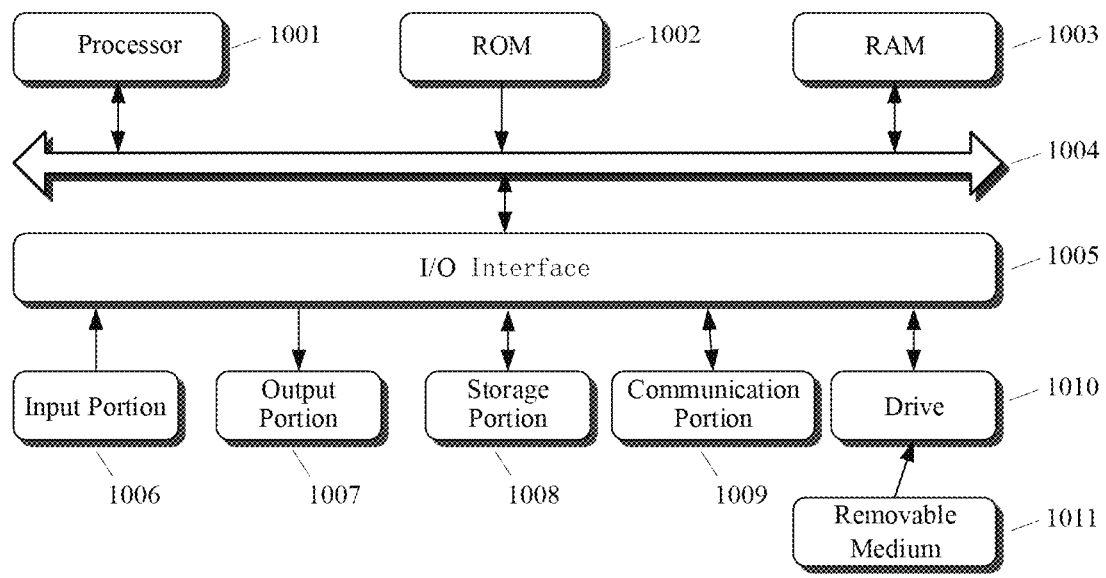
FIG. 10 is a schematic structural diagram of a computer system suitable for implementing embodiments of the present disclosure.

Referring next to FIG. 10, showing a schematic structural diagram of a computer system 1000 suitable for implementing devices (e.g., the devices 101, 102, 103, 105, 107 shown in FIG. 1) of embodiments of the present disclosure. The device shown in FIG. 10 is only an example and shall not impose any limitation on the functionality and scope of use of the embodiments of the present disclosure.

As shown in FIG. 10, the computer system 1000 includes a processor (e.g., CPU, central processing unit) 1001 that can perform various appropriate actions and processes based on programs stored in a read-only memory (ROM) 1002 or loaded into a random access memory (RAM) 1003 from a storage portion 1008. In the RAM 1003, various programs and data required for operation of the system 1000 are also stored. The processor 1001, the ROM 1002, and the RAM 1003 are connected to each other via a bus 1004. An input/output (I/O) interface 1005 is also connected to the bus 1004.

The following components are connected to the I/O interface 1005: an input portion 1006 including a keyboard, a mouse, etc.; an output portion 1007 including, for example, a cathode ray tube (CRT), a liquid crystal display (LCD), etc., and a speaker, etc.; the storage portion 1008 including a hard disk, etc.; and a communication portion 1009 including a network interface card such as a LAN card, a modem. The communication portion 1009 performs communication processing via a network such as the Internet. A drive 1010 is also connected to the I/O interface 1005 as needed. A removable medium 1011, such as a disk, a CD-ROM, a magnetic disc, a semiconductor memory, is mounted on the drive 1010 as needed, so that a computer program read therefrom may be installed into the storage portion 1008 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 1009, and/or may be installed from the removable medium 1011. The computer program, when executed by the processor 1001, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical/tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, comprising a first determining unit, a second determining unit, a third determining unit, and an outbound delivering unit, where the names of these units or modules do not in some cases constitute a limitation to such units or modules themselves. For example, the outbound delivering unit may also be described as "a unit for classifying the to-be-delivered items, target storage positions of which belonging to a same shelf in a same storage area, in the set of tasks into a same picking task for outbound delivery processing."

In another aspect, embodiments of the present disclosure further provide a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: determine, in response to receiving a set of tasks comprising a plurality of outbound delivering tasks, in a plurality of storage areas, a storage position of a to-be-delivered item in each outbound delivering task in the set of tasks; determine, from the plurality of storage areas, a target storage area corresponding to the set of tasks based on storage positions of to-be-delivered items in the outbound delivering tasks; determine, from the target storage area, target storage positions of the to-be-delivered items in the outbound delivering tasks; and classify the to-be-delivered items, target storage positions of which belonging to a same shelf in a same storage area, in the set of tasks into a same picking task for outbound delivery processing.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in embodiments of the present disclosure are examples.

What is claimed is:

1. A method for outbound delivering an item, wherein items are stored in a plurality of storage areas, each storage area in the plurality of storage areas comprises a plurality of shelf groups, each shelf group in the plurality of shelf groups comprises a plurality of shelves, each shelf is provided with a plurality of storage positions on separate shelf levels, and the method comprises:
   in response to receiving a set of tasks comprising a plurality of outbound delivering tasks, determining, in the plurality of storage areas, a storage position of a to-be-delivered item in each outbound delivering task in the set of tasks;
   determining, from the plurality of storage areas, a target storage area corresponding to the set of tasks based on storage positions of to-be-delivered items in the outbound delivering tasks;
   determining, from the target storage area, target storage positions of the to-be-delivered items in the outbound delivering tasks; and
   classifying to-be-delivered items, target storage positions of which belonging to a same shelf in a same storage area, in the set of tasks into a same picking task for outbound delivery processing,
   wherein a plurality of shelves in each storage area of the plurality of storage areas are arranged in a circular shape and form the plurality of shelf groups, each shelf group in the plurality of shelf groups is rotatable in a same direction as a whole to select a shelf rotated to a preset position as an outbound delivering shelf,
   wherein the delivery processing comprises:
   binding the picking task to a crate, and binding the picking task to a shelf corresponding to the picking task; and
   rotating a shelf group in which the shelf corresponding to the picking task is located, so that the shelf corresponding to the picking task is rotated to the preset position to become the outbound delivering shelf.

2. The method according to claim 1, wherein the determining, from the plurality of storage areas, a target storage area corresponding to the set of tasks based on the storage positions of to-be-delivered items in the outbound delivering tasks, comprises:
   for each type of to-be-delivered items corresponding to the set of tasks, determining remaining shelf lives of the to-be-delivered items of the each type in storage areas where the to-be-delivered items of the each type are stored; and
determining, based on the remaining shelf lives of the to-be-delivered items of the each type, the target storage area corresponding to the set of tasks.

3. The method according to claim 2, wherein the determining, based on the remaining shelf lives of the to-be-delivered items of the each type, the target storage area corresponding to the set of tasks, comprises:
determining, based on the remaining shelf lives of the to-be-delivered items of the each type, priority levels of the to-be-delivered items of the each type, wherein, for the each type of to-be-delivered items, the priority levels of the to-be-delivered items of the each type are negatively correlated with the remaining shelf lives of the to-be-delivered items of the each type; and
determining the target storage area corresponding to the set of tasks, based on the priority levels of the to-be-delivered items of the each type.

4. The method according to claim 1, wherein the determining, from the plurality of storage areas, a target storage area corresponding to the set of tasks based on storage positions of to-be-delivered items in the outbound delivering tasks, comprises:
determining, from the plurality of storage areas, a minimum number of storage areas that satisfy delivering requirements represented by the set of tasks; and
in response to determining that the minimum number is one, determining the storage area corresponding to the minimum number as the target storage area corresponding to the set of tasks.

5. The method according to claim 4, wherein the plurality of storage areas are on different floors;
the determining, from the plurality of storage areas, a target storage area corresponding to the set of tasks based on storage positions of to-be-delivered items in the outbound delivering tasks, comprises:
in response to determining that the minimum number is greater than one, determining, from at least one storage area group, storage areas in a storage area group that is on a same floor as target storage areas corresponding to the set of tasks, wherein each storage area group in the at least one storage area group comprises storage areas of the minimum number, and each storage area group is capable of satisfying the delivering requirements represented by the set of tasks.

6. The method according to claim 5, wherein the determining, from the plurality of storage areas, a target storage area corresponding to the set of tasks based on storage positions of to-be-delivered items in the outbound delivering tasks, comprises:
in response to determining that there is no storage area group that is on the same floor in the at least one storage area group, determining an operational cost for each storage area group to complete the delivering tasks in the set of tasks; and
determining a target storage area group based on the operational cost for each storage area group, and determining storage areas in the target storage area group as the target storage areas.

7. The method according to claim 1, wherein the determining, from the target storage area, target storage positions of the to-be-delivered items in the outbound delivering tasks, comprises:
for each type of to-be-delivered item in the set of tasks, performing operations as follows:
determining a to-be-delivered number of the type of to-be-delivered item in the plurality of outbound delivering tasks; and
determining, in the target storage area, a storage position in which the type of to-be-delivered item is stored as the target storage position for the to-be-delivered item, wherein an inventory of the type of to-be-delivered item at the target storage position is greater than the to-be-delivered number of the type of to-be-delivered item, and the inventory of the type of to-be-delivered item at the target storage position is closest to the to-be-delivered number of the to-be-delivered item.

8. The method according to claim 1, wherein a shelf in each storage area in the plurality of storage areas includes a plurality of shelf levels; and
the determining, from the target storage area, target storage positions of the to-be-delivered items in the outbound delivering tasks, comprises:
determining the target storage positions of the to-be-delivered items according to priority levels of the plurality of shelf levels of each shelf in the target storage area, wherein the priority levels of the plurality of shelf levels of each shelf decrease from a middle shelf level to both ends.

9. The method according to claim 1, wherein the determining, from the target storage area, target storage positions of the to-be-delivered items in the outbound delivering tasks, comprises:
determining, based on an order in which shelves in the shelf groups in the target storage area are arranged, priorities of the shelves; and
determining the target storage positions of the to-be-delivered items in the outbound delivering tasks according to the priorities of the shelves.

10. The method according to claim 1, wherein
the determining, from the target storage area, target storage positions of the to-be-delivered items in the outbound delivering tasks, comprises:
performing determination operations based on the storage positions of types of to-be-delivered items in the target storage area corresponding to the set of tasks as follows:
determining a target shelf having a largest variety types of current to-be-delivered items stored thereon, and determining remaining to-be-delivered items as current to-be-delivered items for performing a next determination operation; and
for each type of to-be-delivered item, determining a storage position of the to-be-delivered item of the each type on the corresponding target shelf as the target storage position of the to-be-delivered item.

11. The method according to claim 10, wherein the method further comprises:
determining, for each shelf group of the plurality of shelf groups in the target storage area, a rotation direction for the shelf group according to a principle of shortest rotation distance of the shelf group and based on a current position of the outbound delivering shelf.

12. The method according to claim 1, wherein the method further comprises:
in response to determining that the shelf corresponding to the picking task is rotated to the preset position to become the outbound delivering shelf, instructing through a preset display a preset personnel to pick the to-be-delivered items from the outbound delivering shelf indicated by the picking task to the crate, to convey the to-be-delivered items indicated by the picking task.

13. The method according to claim 12, wherein the method further comprises:
determining a number of to-be-delivered items in the crate; and
in response to determining that the number of to-be-delivered items in the crate is less than the number of to-be-delivered items represented by the picking task, redetermining target storage positions for extra to-be-delivered items for the picking task.

14. The method according to claim 12, wherein the method further comprises:
scanning item identifiers of the to-be-delivered items on the outbound delivering shelf, and displaying item information of the scanned to-be-delivered items by presetting in an electronic tag of a target cache lane entrance.

15. The method according to claim 12, wherein the method further comprises:
determining whether there is a relay task for the crate, wherein the relay task is used to represent that there is a to-be-delivered item from a storage area other than the target storage area that requires to be conveyed by the crate; and
conveying, in response to determining that there is the relay task for the crate, the crate to the storage area corresponding to the relay task.

16. The method according to claim 1, wherein the set of tasks is multiple; and
the method further comprises:
prioritizing the set of tasks for outbound delivery processing, in response to determining that the set of tasks satisfies at least one of:
time information corresponding to the set of tasks satisfying a preset time threshold;
the set of tasks comprising an delivery processing operation that requires cooperation of a preset personnel;
the set of tasks comprising the to-be-delivered items stored in a plurality of storage areas;
a ratio of a to-be-delivered number of all to-be-delivered items comprised in the set of tasks to a number of types of the to-be-delivered items satisfying a preset ratio threshold;
a number of shelves corresponding to the set of tasks being less than a preset number threshold.

17. A warehouse system for items, comprising: a plurality of storage areas, and an operation area provided in matching with the plurality of storage areas, wherein:
each storage area in the plurality of storage areas comprises a plurality of shelf groups consisting of a plurality of shelves arranged in a circular shape, each shelf group in the plurality of shelf groups is rotatable in a same direction as a whole driven by a drive apparatus, and each shelf is provided with a plurality of storage positions; and
the operation area is provided with a conveying apparatus for conveying a crate in and out of the operation area, and the crate is used to receive to-be-delivered items determined by an operator performing a picking task on a delivering shelf rotated to a preset position,
wherein the conveying apparatus comprises a conveying line, and a jacking and transferring apparatus provided on the conveying line;

a plurality of cache lane entrances are provided adjacent to the conveying line, and the crate is provided with a crate identifier:
the crate identifier on the crate is scanned by using a scanning apparatus provided on the conveying line to bind the crate to a target cache lane entrance in the plurality of cache lane entrances, and to bind the crate to the picking task; and
each cache lane entrance in the plurality of cache lane entrances instructs the operator by using an electronic tag corresponding to the cache lane entrance, to perform a picking task binding to a crate transferred into the each cache lane entrance by the jacking and transferring apparatus.

18. The system according to claim 17, wherein the plurality of storage areas are set up on different floors, and one operation area is set up and matched with at least one storage area set up on a same floor; and
the conveying apparatus further comprises a hoist for conveying the crate between conveying apparatuses on upper and lower floors.

19. The system according to claim 17, wherein the operating area is separated from the storage area by a thermal insulating wall, and an automatic door connected to the operating area is set at the preset position corresponding to each shelf group; and
a preset display displaying information of items on the delivering shelf is provided corresponding to each automatic door.

20. A method for controlling a warehouse system, comprising:
determining a shelf indicated by a received picking task, wherein to-be-delivered items represented by the picking task are stored in a same shelf in a same storage area;
rotating, by using a drive apparatus, a shelf group to which the shelf indicated by the picking task belongs, so that the shelf indicated by the picking task is rotated to a preset position to become an outbound delivering shelf, to instruct an operator to pick the to-be-delivered items represented by the picking task in the delivering shelf into a crate; and
conveying, in response to determining that the crate receives the to-be-delivered items represented by the picking task, the to-be-delivered items out of a warehouse by using a conveying apparatus,
wherein, before the rotating, by using a drive apparatus, a shelf group to which the shelf indicated by the picking task belongs, so that the shelf indicated by the picking task is rotated to a preset position to become a delivering shelf, the method further comprises:
scanning a crate identifier on the crate by using a scanning apparatus in a target operating area, and binding the crate to a target cache lane entrance in a plurality of cache lane entrances, and binding the crate to the picking task, wherein the target operating area is an operating area corresponding to the storage area where the shelf indicated by the picking task is located; and
conveying the crate to the target cache lane entrance by using the conveying apparatus.

21. The method according to claim 20, wherein the method further comprises:
displaying item information of the to-be-delivered items corresponding to the picking task by using an electronic tag corresponding to the target cache lane entrance; and the instruct an operator to pick the to-be-delivered items represented by the picking task in the delivering shelf into a crate, comprises:

in response to determining that the shelf indicated by the picking task is rotated to the preset position to become the outbound delivering shelf, controlling an automatic door to open, and displaying item information of items on the delivering shelf through a preset display corresponding to the automatic door.

22. The method according to claim 21, wherein the displaying item information of the to-be-delivered items corresponding to the picking task by using an electronic tag corresponding to the target cache lane entrance, comprises:

scanning item identifiers of the to-be-delivered items on the delivering shelf, and displaying, by a presetting manner, the item information of the scanned to-be-delivered items in the electronic tag of the target cache lane entrance.

* * * * *